US008340003B2

(12) United States Patent
Tsai et al.

(10) Patent No.: US 8,340,003 B2
(45) Date of Patent: Dec. 25, 2012

(54) H-ARQ ACKNOWLEDGMENT DETECTION VALIDATION BY RE-DECODING

(75) Inventors: Ming-Chang Tsai, San Diego, CA (US); James J. Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/152,875

(22) Filed: Jun. 3, 2011

(65) Prior Publication Data

US 2011/0292811 A1    Dec. 1, 2011

Related U.S. Application Data

(63) Continuation of application No. 11/971,842, filed on Jan. 9, 2008, now Pat. No. 7,978,635.

(60) Provisional application No. 60/896,034, filed on Mar. 21, 2007.

(51) Int. Cl.
*G08C 25/02* (2006.01)
*G08C 25/04* (2006.01)
*H04J 3/24* (2006.01)
*H04L 1/08* (2006.01)
*G06F 11/00* (2006.01)

(52) U.S. Cl. ........... 370/282; 714/48; 714/748; 714/752

(58) Field of Classification Search .................. 370/278, 370/282, 310, 335–337, 349, 373; 714/48, 714/746, 748, 749, 751, 752, 764
See application file for complete search history.

(56) References Cited

U.S. PATENT DOCUMENTS

| | | | | | |
|---|---|---|---|---|---|
| 6,621,871 | B2 * | 9/2003 | Ross et al. | ..................... | 375/262 |
| 6,909,758 | B2 * | 6/2005 | Ramesh et al. | ............... | 375/340 |
| 7,206,280 | B1 * | 4/2007 | Khan et al. | ..................... | 370/216 |
| 7,978,635 | B2 | 7/2011 | Tsai et al. | | |
| 8,024,633 | B2 * | 9/2011 | Hafeez et al. | ................. | 714/748 |
| 8,059,739 | B2 * | 11/2011 | Jonsson | ....................... | 375/262 |
| 2002/0015451 | A1 * | 2/2002 | Nafie et al. | .................... | 375/262 |
| 2002/0172208 | A1 * | 11/2002 | Malkamaki | .................. | 370/400 |
| 2003/0021240 | A1 * | 1/2003 | Moon et al. | .................... | 370/320 |

(Continued)

FOREIGN PATENT DOCUMENTS

CN        1698302 A     11/2005

(Continued)

OTHER PUBLICATIONS

International Search Report and Written Opinion—PCT/US2008/057755, International Search Authority—European Patent Office—Jul. 24, 2008.

(Continued)

*Primary Examiner* — Chi Pham
*Assistant Examiner* — Ahmed Elallam
(74) *Attorney, Agent, or Firm* — Charles E. Eggers

(57) ABSTRACT

Systems and methodologies are described that facilitate reliably receiving a sequence of data packets in a wireless communications environment. In particular, mechanisms are provided that enhance hybrid automatic repeat request protocols through validation of acknowledgment message detection by re-decoding. A transmitter sends a data packet from a sequence of packets in one or more data transmissions. A receiver acknowledges the data packet upon obtaining sufficient transmissions to decode the packet. The receiver re-decodes a successive data transmission in combination with previously received transmissions to validate if the transmitter detected the acknowledgment.

31 Claims, 13 Drawing Sheets

U.S. PATENT DOCUMENTS

| | | | |
|---|---|---|---|
| 2003/0112780 A1* | 6/2003 | Ouyang et al. | 370/338 |
| 2004/0190552 A1* | 9/2004 | Kim et al. | 370/469 |
| 2004/0242231 A1* | 12/2004 | Tang et al. | 455/434 |
| 2005/0172197 A1* | 8/2005 | Chamberlain | 714/748 |
| 2005/0213505 A1* | 9/2005 | Iochi et al. | 370/236 |
| 2005/0249163 A1* | 11/2005 | Kim et al. | 370/335 |
| 2007/0016838 A1* | 1/2007 | Mielczarek et al. | 714/749 |
| 2007/0147289 A1* | 6/2007 | Nibe | 370/329 |
| 2007/0149149 A1* | 6/2007 | Nibe | 455/115.1 |
| 2007/0245201 A1* | 10/2007 | Sammour et al. | 714/748 |
| 2007/0263739 A1* | 11/2007 | Garrett et al. | 375/260 |
| 2007/0274264 A1* | 11/2007 | Jiang | 370/333 |
| 2008/0133995 A1* | 6/2008 | Lohr et al. | 714/748 |
| 2008/0282125 A1* | 11/2008 | Hafeez et al. | 714/748 |

FOREIGN PATENT DOCUMENTS

| | | |
|---|---|---|
| EP | 1187386 A1 | 3/2002 |
| EP | 1594247 A2 | 11/2005 |
| JP | 2000269929 | 9/2000 |
| WO | WO03052998 A1 | 6/2003 |

OTHER PUBLICATIONS

Taiwanese Search report—097109498—TIPO—Dec. 28, 2011.

\* cited by examiner

H-ARQ ACKNOWLEDGMENT DETECTION VALIDATION BY RE-DECODING

CROSS-REFERENCE TO RELATED APPLICATIONS

This application is a continuation of U.S. patent application Ser. No. 11/971,842 filed Jan. 9, 2008, which claims the benefit of U.S. Provisional Patent application Ser. No. 60/896,034 entitled "H-ARQ ACK DETECTION VALIDATION BY RE-DECODING" which was filed Mar. 21, 2007. The entirety of the aforementioned applications are herein incorporated by reference.

BACKGROUND

I. Field

The following description relates generally to communications systems and more particularly to validating transmissions between a transmitter and a receiver by re-decoding transmissions.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

Sending and receiving information is at the core of the communications industry. Recent increases in media content and applications have created high demand for efficiency and reliability in transmitting and receiving data. Hybrid automatic repeat request (H-ARQ) protocol is one mechanism for transmitting data that has been somewhat effective; however, there are obstacles to truly efficient and seamless transmission. Early solutions relied on power-hungry or highly complex routines which simply re-allocate resources (such as computational time and power) rather than solving the underlying problem.

H-ARQ and ACK protocols have furthered data transmissions, but there are shortcomings. The receiver sends an acknowledgment (ACK) to the transmitter to signal receipt of the data. Upon receiving the ACK, the transmitter begins transmission of the next data packet. This process continues until all data packets are transmitted and received. Under ideal conditions, the ACK is always received promptly by the transmitter, and there is little loss in throughput. However, ideal conditions rarely, if ever, exist. Frequently, the ACK is not received by the transmitter resulting in latency as the transmitter continues to send transmissions that have already been successfully received by the receiver. Worse, the transmitter can be instructed by a scheduler to suspend or postpone the data packet transmission when there is no substantial need to take such drastic measures.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for receiving a sequence of data packets is described herein. The method can comprise receiving a data transmission corresponding to a data packet from the sequence of data packets. In addition, the method can include combining the data transmission with one or more previously received data transmissions. The method can also comprise re-decoding the resultant combination.

Another aspect relates to a wireless communications apparatus that can comprise a memory that retains instructions related to receiving a data transmission corresponding to a data packet from the sequence of data packets, combining the data transmission with one or more previously received data transmissions and re-decoding the resultant combination. The wireless communications apparatus can also include a processor coupled to the memory, configured to execute the instructions retained in the memory.

Yet another aspect relates to a wireless communications apparatus that facilitates receiving a sequence of packets. The apparatus can include means for receiving a data transmission corresponding to a data packet from the sequence of data packets. In addition, the apparatus can include means for combining the data transmission with one or more previously received data transmissions. The apparatus can further comprise means for re-decoding the resultant combination.

Still another aspect relates to a machine-readable medium having stored thereon machine-executable instructions for receiving a data transmission corresponding to a data packet from the sequence of data packets. The machine-readable medium can further comprise instructions for combining the data transmission with one or more previously received data transmissions. In addition, the machine-readable medium can include instructions for re-decoding the resultant combination.

According to another aspect, in a wireless communications system, an apparatus can comprise an integrated circuit. The integrated circuit can be configured to receive a data transmission corresponding to a data packet from the sequence of data packets. The integrated circuit can be further configured to combine the data transmission with one or more previously received data transmissions. In addition, the integrated circuit can be configured to re-decode the resultant combination.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
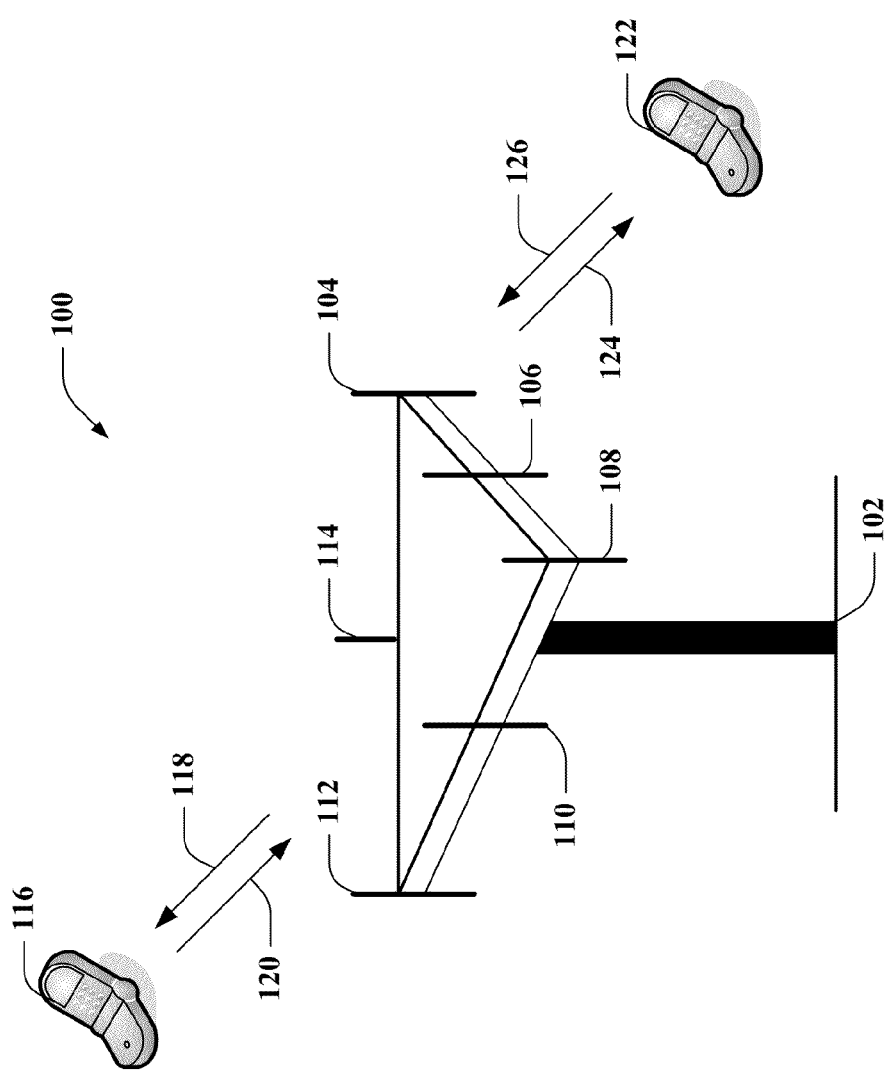
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone handset, a Session Initiation Protocol (SIP) phone, a wireless local loop (WLL) station, a personal digital assistant (PDA), smart phones, MP3 players, digital cameras, a handheld device having wireless connection capability, computing device, or other processing device connected to a wireless modem. It is to be appreciated that aspects described herein are not limited to devices with mobility. For example, stationary UE or fixed wireless UE can be employed. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

The set of antennas and/or the area in which they are designated to communicate may be referred to as a sector of base station 102. For example, multiple antennas may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

According to an example, system 100 may be a multiple-input multiple-output (MIMO) communication system. Further, system 100 may utilize any type of duplexing such as FDD, TDD, etc. Pursuant to an illustration, base station 102 may transmit over forward links 118 and 124 to mobile devices 116 and 122. Moreover, mobile devices 116 and 122 may estimate respective forward link or downlink channels and generate corresponding feedback that may be provided to base station 102 via reverse links or uplinks 120 and 126. In addition, base station 102 may transmit data to mobile device 116 and 122 over forward links 118 and 124 respectively in a plurality of data packets. It is to be appreciated that mobile devices 116 and 122 can transmit data to base station 102 via reverse links 120 and 126 respectively in a plurality of data packets.

In packet transmission schemes, the transmitter (e.g., base station 102 and/or mobile devices 116 and 122) can segment a data stream into a series of data packets transmitted in turn. A hybrid automatic repeat request (H-ARQ) protocol can be employed to improve reliability of a transmission of data packets. In an example H-ARQ error control method, a receiver (e.g., base station 102 and/or mobile devices 116 and 122) that successfully decodes a received data packet signals the transmitter by sending an acknowledgment (ACK) message. The transmitter continues to transmit or retransmit a particular data packet in a series until an ACK is detected. In an embodiment, a maximum number of retries can be specified. If the transmitter fails to detect an ACK, synchronization is lost between the transmitter and the receiver resulting in throughput loss. In the case of data transmission from base station 102 to mobile devices 116 and 122 over the forward links 118 and 124, the mobile devices 116 and 122 can validate ACK detection by the base station 102 by re-decoding. The mobile devices 116 and 122 can receive data packet transmission from the base station 102 and combine successive transmissions until a successful decode is obtained. Upon successful decode, the mobile devices 116 and 122 signal the base station 102 with an ACK message. The mobile devices can validate ACK detection by re-decoding a subsequently received data packet transmission in combination with some or all previously received transmissions. A successful re-decode can indicate that the ACK message was not detected and should be sent again. A failed re-decode can indicate the ACK message was detected and the current data transmission received is for the next packet in the plurality of packets comprising the data transmission. For example, a successful decode can occur at after the third packet retransmission. In this illustrative instance, three transmissions of a data packet provide sufficient information or redundancy for correct decoding. If re-decoding is successful with the fourth transmission in combination with the previous transmission, an ACK message can be sent again as the previous message may not have been detected. However, if re-decoding fails, the fourth transmission can be a subsequent data packet in the series. It is to be appreciated that base station 102 can employ similar mechanisms in receiving transmissions from mobile devices 116 and 122 via reverse links 120 and 126. In addition, to reduce loss of throughput, transmissions received after a successful decode can be normally decoded as if the transmission correlate to the next data packet in a sequence. This normal decoding process can occur in parallel or concurrently with the re-decoding.

Figure 2:
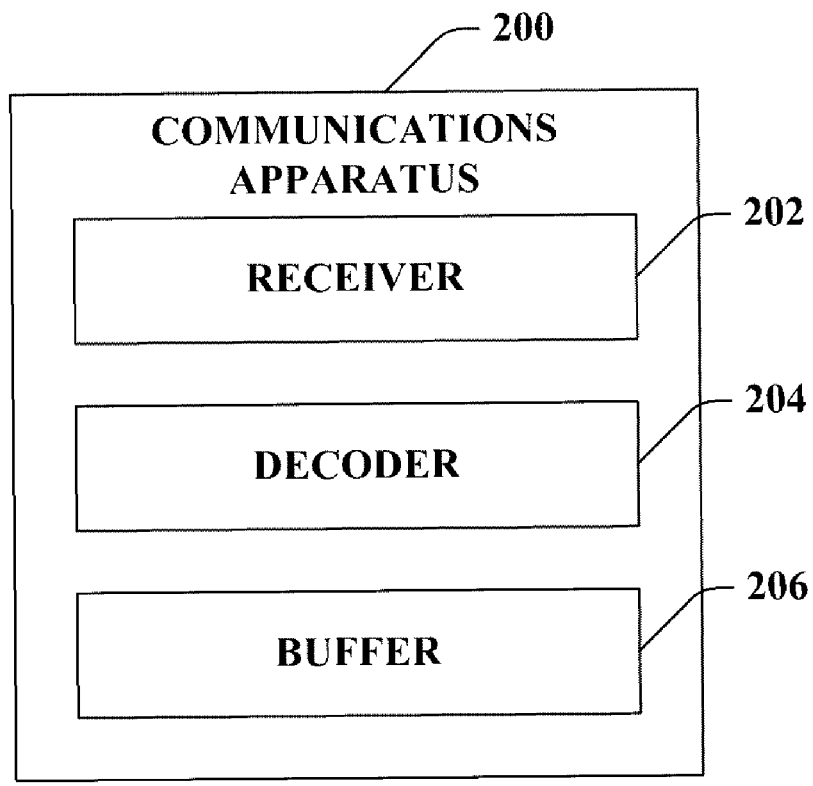
FIG. 2 is an illustration of an example communications apparatus for employment in a wireless communications system according to an aspect of the subject disclosure.

Turning now to FIG. 2, illustrated is a communications apparatus 200 for employment in a wireless communications environment. Communications apparatus 200 can be a base station or a portion thereof. In addition, communications apparatus 200 can be a mobile device or a portion thereof. Communications apparatus 200 includes a receiver 202 that obtains data transmissions from a transmitter (not shown). The data transmissions can comprise a series of data packets. The receiver 202 can employ H-ARQ mechanisms to improve transmission reliability and receiver-transmitter synchronization. For example, the receiver 202 can obtain a data transmission from a transmitter and, upon successful receipt and decoding, send an acknowledgment (ACK) back to the transmitter. The acknowledgment indicates to the transmitter that the data transmission has been successfully received and processed such that the transmitter can commence transmission of a next data packet of a data stream. However, the transmitter does not always detect the acknowledgment which results in the transmitter sending redundant information. Synchronization between the receiver 202 and the transmitter is lost in this situation since the transmitter retransmits a redundant packet while the receiver 202 expects the next packet of the data stream. Accordingly, throughput of the communications system is also negatively affected.

Despite imperfect information regarding receipt of the acknowledgment message, communications apparatus 200 can continue to receive and decode transmissions from a transmitter. Once a data packet, received by communications apparatus 200, is successfully decoded, subsequent packet transmissions can be validated by re-decoding the subsequent transmission in combination with some or all previously received transmissions. In addition, the subsequent transmission can be decoded normally as if corresponding to a next data packet of the data stream. The normal decode can occur in parallel with the re-decoding. Following a first successful decoding, if the latest transmission successfully decodes in combination with the previously received transmissions, the latest transmission corresponds to a data packet that has already been successfully received and decoded. A successful re-decode indicates that the transmitter did not detect the acknowledgment and it needs to be sent again. If decoding of the latest transmission in combination with previously received transmissions fails, the latest transmission corresponds to a next data packet in a series of data packets comprising the data stream. Thus, it can be validated that the acknowledgment was successfully detected by the transmitter. This decode, re-decode and validation process can repeat on each successive data packet until all packets of a stream are received and decoded.

Communications apparatus 200 includes the receiver 202 that obtains data transmission and/or data packets from a transmitter (not shown). In addition, communications apparatus 200 includes a decoder 204 that attempts to decode obtained data transmissions and/or data packets to recover traffic data of a data stream from the coded, modulated and/or interleaved symbols of the transmission. Several retransmissions of a particular data packet can be required before a successful decode can occur. For example, errors can be introduced in a transmission due to channel conditions, power constraints, interference levels, or the like, such that the packet cannot be decoded. Retransmissions of a particular packet provide decoder 204 with sufficient information to successfully recover the traffic data associated with the data packet. Communications apparatus 200 includes a buffer 206 that facilitates retaining previous transmission for combination with newly obtained packets. Upon a successful decode, communications apparatus 200 can send an acknowledgment to the transmitter. The buffer 206 retains the previous data packet transmissions to validate acknowledgment detection. The receiver 202 can collect a data packet transmission from the transmitter after the successful decode. The newly obtained data packet can be retained by buffer 206 along with the previously obtained packets also stored. The decoder 204 can re-decode the newly obtained data packet in combination with some or all the previously received packets. Moreover, the buffer 206 can retain the newly obtained data packet such that decoder 204 can normally decode the packet in parallel with re-decoding the combination to reduce loss in throughput. A successful re-decode indicates that the transmitter did not detect the acknowledgment sent by communications apparatus 200. A failed re-decode by decoder 204 indicates that the newly obtained data packet is a packet subsequent to the last decoded packet in a series of packets making up the data stream.

Moreover, although not shown, it is to be appreciated that communications apparatus 200 may include memory that retains instructions with respect to receiving data packet transmissions, combining data packet transmissions, decoding data transmissions, sending acknowledgment messages, and the like. Further the memory can retain previously received data packets for combination prior to decoding. Further, communications apparatus 200 may include a processor that may be utilized in connection with executing instructions (e.g., instructions retained within memory, instructions obtained from a disparate source, . . . ).

Figure 3:
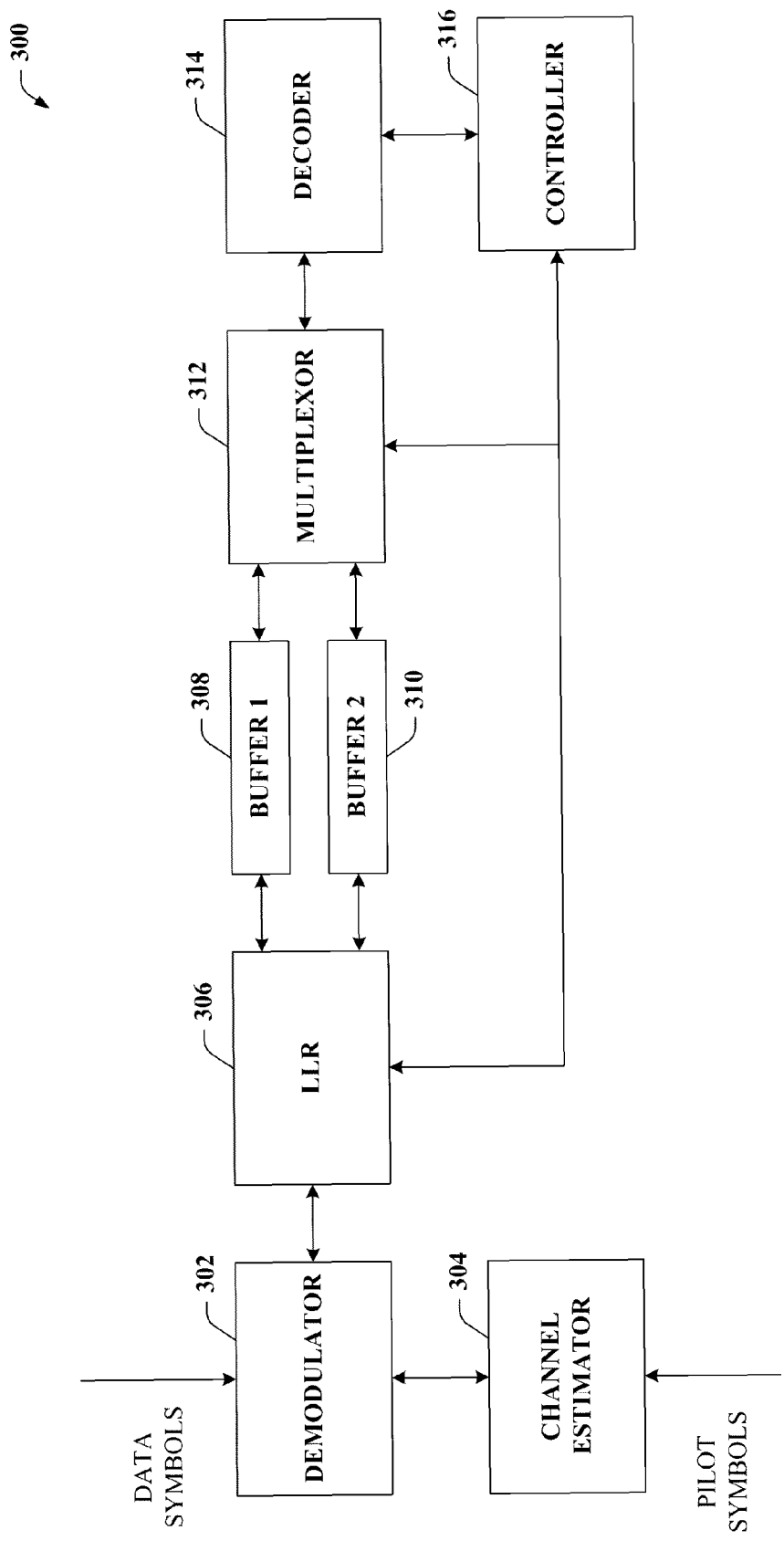
FIG. 3 is an illustration of an example receiver employable in a wireless communications system according to an aspect of the subject disclosure.

FIG. 3 illustrates an example receiver system 300 employable in a wireless communications system. System 300 can obtain data symbols and pilot symbols. A demodulator 302 collects data symbols and demodulates the symbols to facilitate additional processing. In addition, system 300 includes a channel estimator 304 that obtains pilot symbols from a pilot channel. The channel estimator 304 utilizes pilot symbols to generate an estimate of channel response. The demodulator 302 processes the data symbols to reproduce the coded data mapped to symbols by a transmitter and/or modulator. The demodulator 302 can demodulate based upon a particular modulation scheme (e.g., BPSK, QSPK, M-PSK (phase shift keying), M-QAM (quadrature amplitude modulation) wherein M can be any integer value, for example M=2, etc.) selected for transmission of a data stream corresponding to the data symbols. Demodulator 302 provides demodulated data packets to log—likelihood ratio (LLR) 306. LLR 306 employs a logarithmic of the ratio of the likelihood (e.g, probability) of a received bit being one versus being zero. A ratio equal to zero means the received bit is equally likely to be a one or zero bit (e.g., uncertain what bit was sent). The further away from zero the log ratio becomes, the higher the level of confidence in knowing what bit value was sent. In a H-ARQ scheme, the log—likelihood ratio of each H-ARQ retransmission is combined to get improved decode reliability. LLR 306 is associated with buffers 308 and 310. After demodulator 302 forwards a demodulated packet to LLR 306, the LLR 306 stores the packet in either buffer 308 or buffer 310. In an embodiment, the LLR 306 stores the packet in combination with the contents of the other buffer. For example, LLR can store a newly obtained packet in buffer 308 combined with the packets retained by buffer 310. The data packet contents of either buffer 308 or buffer 310 can be provided to a decoder 314 via a multiplexer 312. Decoder 314 attempts to decode buffer contents to recover traffic data of a data stream from the coded data packets. The buffer contents are retained until a first successful decoding. If decoding is successful, the buffer contents are retained for validation by re-decoding. In addition, receiver system 300 transmits an acknowledgment signal to the originator of the data symbols. A packet obtained subsequent to a successful decode and demodulated by demodulator 302 is stored in buffers 308 and/or 310 in combination with previously received packets. Decoder 314 attempts to re-decode the subsequent packet in combination with the previously retained transmissions. A successful re-decode indicates that the data packet transmitter on the other end of the communication link did not detect the acknowledgment sent by the transmitter on the data packet receiver system 300. If system 300 is employed on a mobile device, the base-station did not detect the acknowledgment sent by the transmitter on the mobile device. On the other hand, if system 300 is employed a base-station, the mobile device did not detect the acknowledgment sent by the transmitter on the base-station. A failed re-decode by decoder 314 indicates that the subsequent packet is a new packet in a series of packets making up the data stream. Thus, the acknowledgement sent by the transmitter associated with receiver system 300 has been correctly received by a transmitter on the other end of a communications link with receiver system 300.

In addition, the packet obtained subsequent to the successful decode and stored in buffers 308 and/or 310 can be retained separately from previously received transmissions. Decoder 314 can decode the subsequent transmission separately as if corresponding to a new data packet. The decode can be concurrent with re-decoding the subsequent transmission in combination with previously received transmissions. Receiver system 300 includes a controller 316 that provides logical control of LLR 306, multiplexer 312 and decoder 314 to facilitate receipt, decode and validation by re-decoding.

Referring to FIGS. 4, 5, 7, and 9, illustrated are methodologies relating to facilitating enhanced data transmission and reception of a transmitter and a receiver despite imperfect conditions there between. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 4:
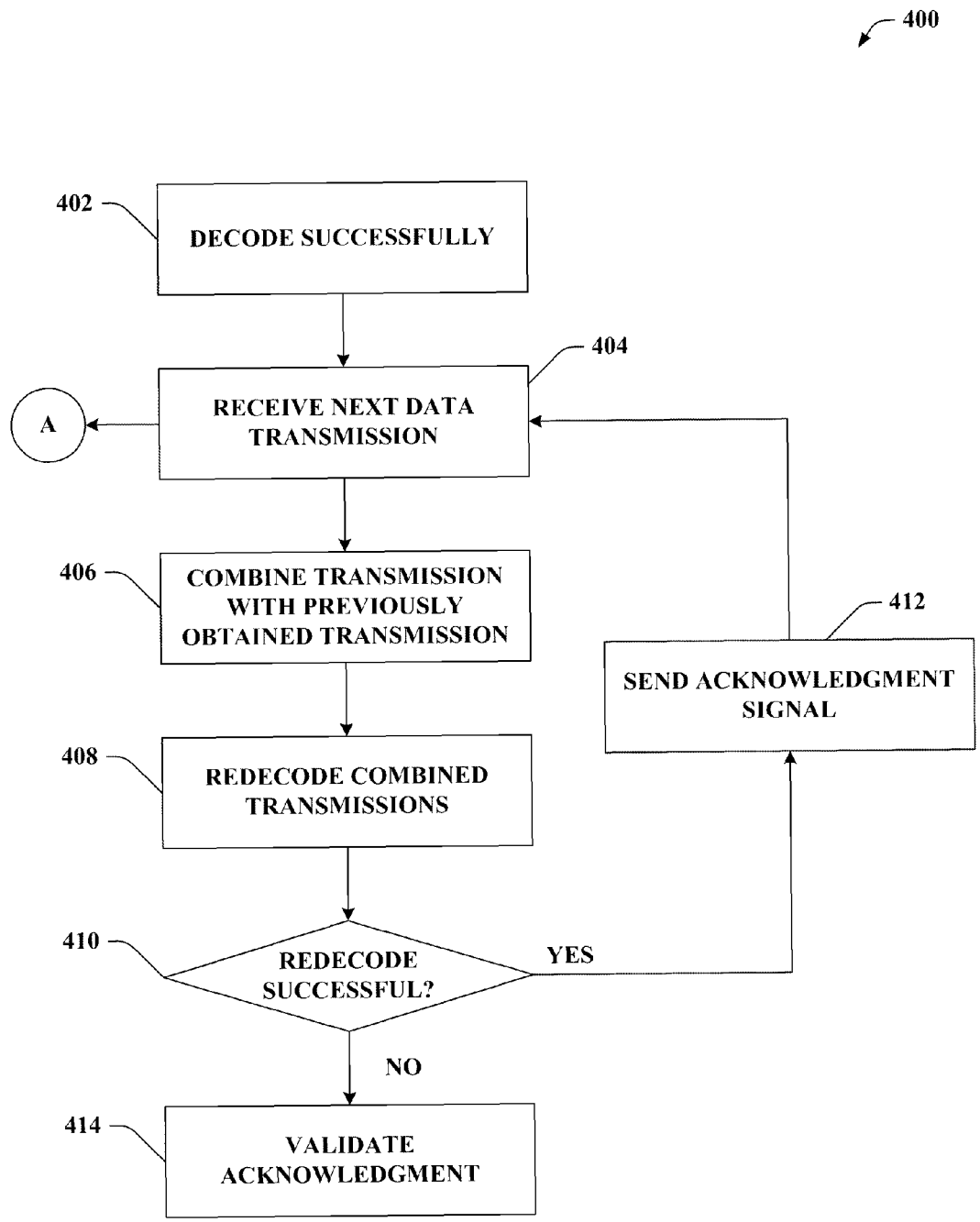
FIG. 4 is an illustration of an example methodology that facilitates acknowledgment detection validation by re-decoding in accordance with an aspect of the subject disclosure.

Turning now to FIG. 4, illustrated is a methodology 400 that facilitates reliably receiving a data transmission. Method 400 can be employed, among other things, to validate that an acknowledgment message has been detected by a transmitter. In an embodiment, method 400 can be implemented on a mobile device and/or a base station in a wireless communications system. At reference numeral 402, a successful decode occurs. It can take one or more transmission of a data packet before sufficient redundancy is obtained to enable a first successful decoding. At reference numeral 402, a next data transmission is received. The data transmission can correspond to at least one packet from a plurality of data packets in a series that comprises a data stream. In addition, the data transmission can be a retransmission of a previously sent packet. The next data packet is retained for re-decoding to validate acknowledgment signal detection. In addition, the transmission is forwarded to a normal decoding cycle A to prevent loss of throughput. The normal decoding cycle A is described in detail below with reference to FIG. 5. At reference numeral 406, the obtained data transmission is combined with previously received transmissions. For example, the data packet can be a first data packet subsequent to a successful decode and signaling of an acknowledgment. As it can require several transmissions or encoded segments to provide sufficient redundancy for a successful decode, one or more transmissions of the data packet can persist. The one or more copies can be combined with the first data packet to facilitate validation of acknowledgment detection. At reference numeral 408, a re-decode is attempted on the combined transmissions. At 410, a determination is made as to whether the re-decode is successful. If the re-decode is successful, the last received data packet is a re-transmission of previously received packets. Accordingly, a successful re-decode provides an indication that the acknowledgment has not been detected. If the re-decode is determined successful at reference numeral 410, the method proceeds to 412 and another acknowledgment signal is sent. A next data packet transmission is received at reference numeral 404 to be combined and re-decoded. It is to be appreciated that the data transmission received after a successful re-decode can also be forwarded to normal decoding cycle A. If, at reference numeral 410, the re-decode is unsuccessful, the method 400 proceeds to reference numeral 414. At 414, validation that the acknowledgment signal has been detected occurs. Thus, an unsuccessful re-decode of combined data packets provides an indication that the acknowledgment signal has been detected.

Figure 5:
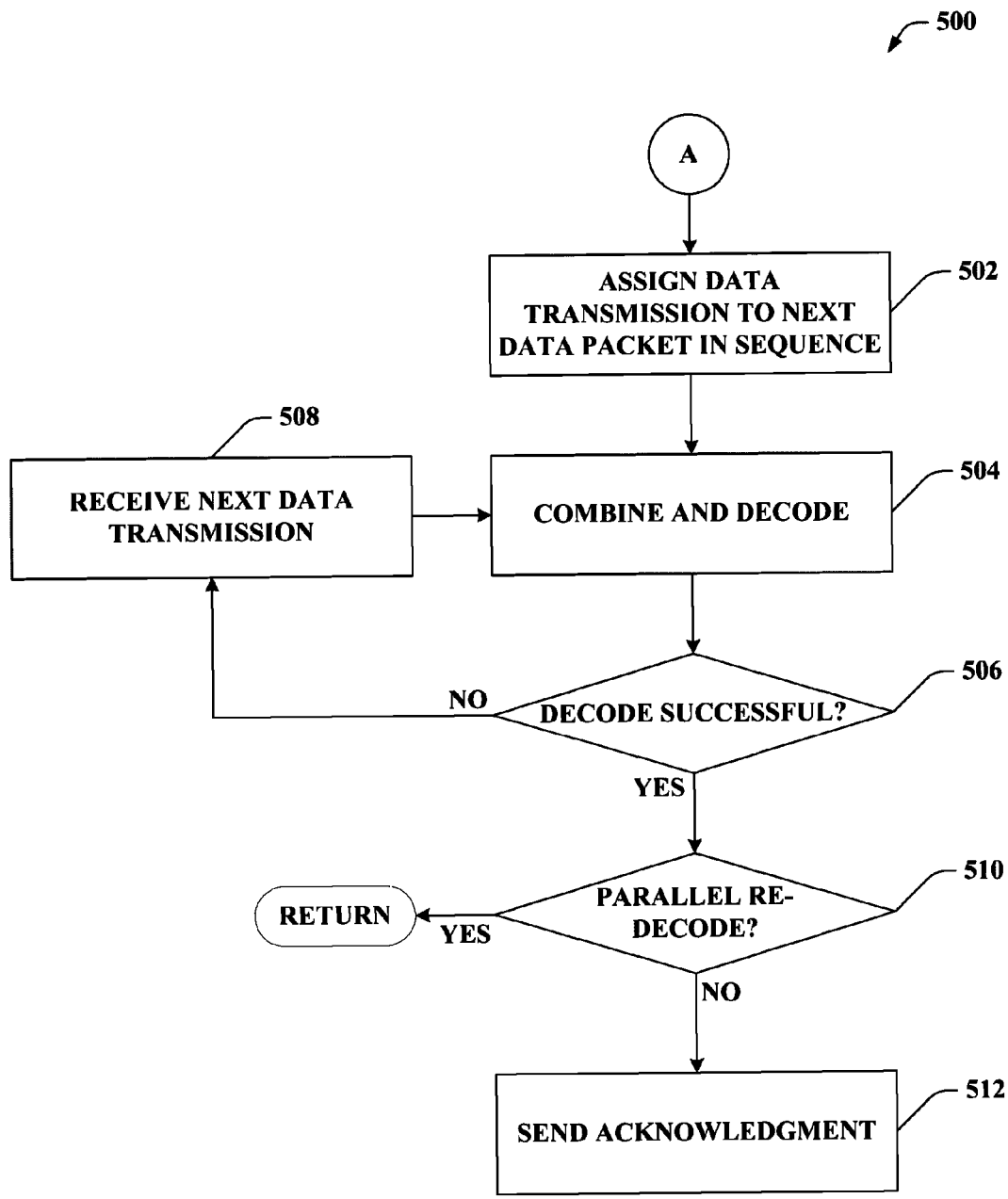
FIG. 5 is an illustration of an example validation scheme according to an aspect of the subject disclosure.

Turning now to FIG. 5, illustrated is a methodology 500 that facilitates reliably receiving a data transmission. Method 500 can be employed, among other things, to validate that an acknowledgment message has been detected by a transmitter. In an embodiment, method 500 can be implemented on a mobile device and/or a base station in a wireless communications system. The method 500 further depicts a normal decode process that occurs in parallel to the re-decoding method 400 described with reference to FIG. 4. A data transmission is forwarded to method 500 from method 400. The data transmission can be a next data transmission following a first successful decode. In addition, the data transmission can be a transmission subsequent to a re-decode or other event. At reference numeral 502, the data transmission is assigned to correspond to a next data packet in a data stream. The next data packet is a successive data packet to that successfully decoded at 402 of FIG. 4. At 504, the data transmission is combined with any previously received transmission, if any, that are also assigned to correspond to the next data packet. In other words, the normal decode cycle can loop one or more times with a data transmission being received each loop. The data transmissions are combined to provide redundancy to facilitate decoding. Also at 504 the data transmission or combination is decoded. At reference numeral 506, a determination is made as to whether the decode is successful. If the decode is not successful, the method 500 proceeds to reference numeral 508 where a subsequent data transmission is received. The subsequent transmission is combined and decoded at 504 and another test is performed to determine success. If the decode is determined to be successful at 506, the method 500 proceeds to reference numeral 510 where a determination is made as to whether a successful re-decode has concurrently occurred in a parallel process with the last received data transmission. If yes, the method 500 returns since the data transmission is a retransmission of previously received and decoded data packet for which the acknowledgment may not have been detected. If a parallel re-decode is unsuccessful, the last transmission corresponds to a subsequent data packet and validation has occurred. At reference numeral 512, an acknowledgment signal is sent to a transmitter indicating receipt of the subsequent data packet.

Figure 6:
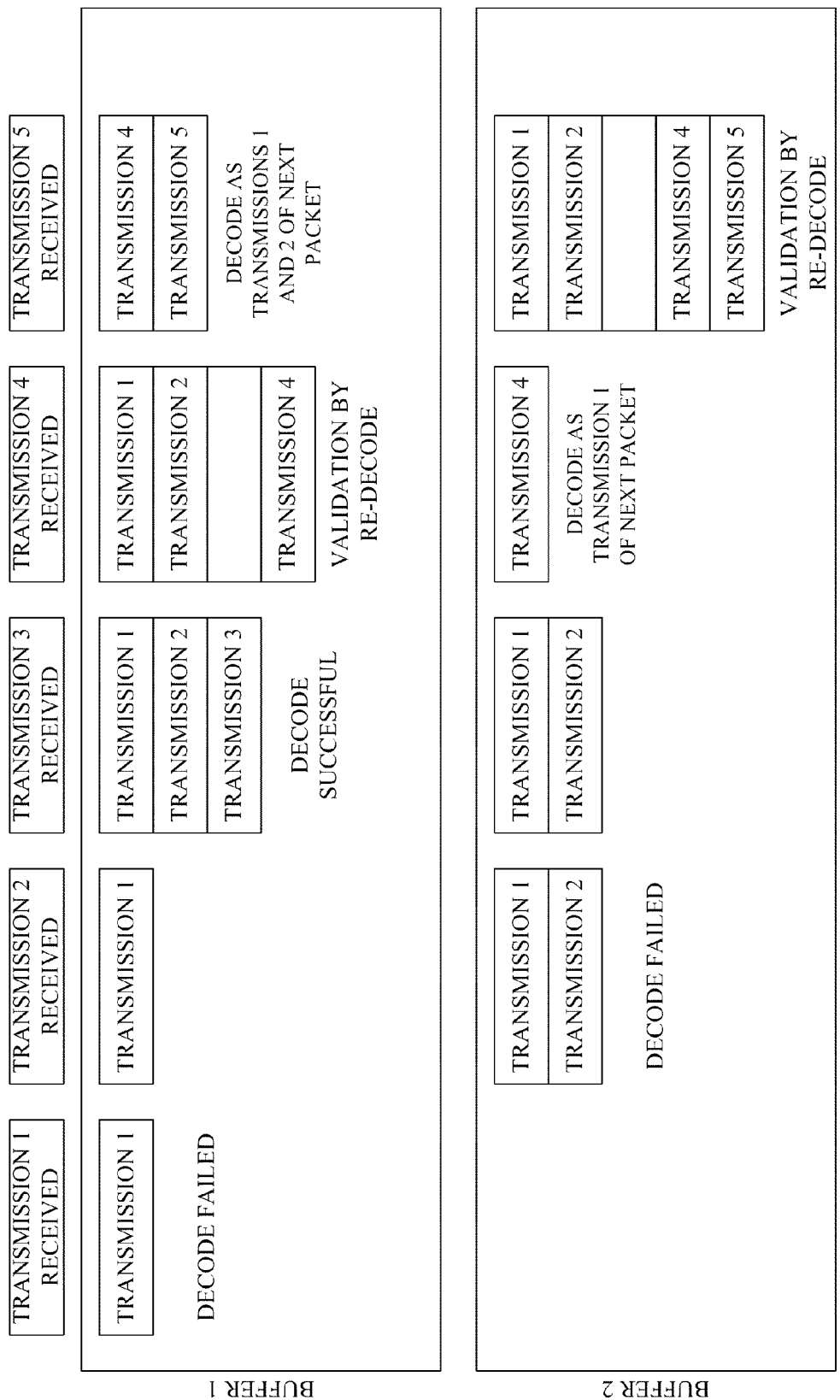
FIG. 6 is an illustration of an example methodology that facilitates validation by re-decoding in accordance with an aspect of the subject disclosure.

Referring to FIG. 6, illustrated is an example implementation of a validation by re-decoding scheme according to an aspect of the subject disclosure. A data packet is received as a plurality of transmissions. While transmissions 1 through 5 are depicted in FIG. 6, it is to be appreciated that a data packet can be received in any number of transmissions. For example, a single transmission of a data packet can be sufficient to enable successful decoding. In addition, two or more transmissions can be necessary to collect a sufficient level of redundancy to overcome errors in individual transmissions of a data packet. Upon successful decoding, re-decoding can occur on subsequent transmissions to validate acknowledgment detection by a transmitter.

Pursuant to the illustration in FIG. 6, transmission 1 is received. This transmission can be retained by buffer 1. In this example, decoding of transmission 1 is unsuccessful. Subsequently, transmission 2 is received and retained in buffer 2 along with the contents previously retained in buffer 1. In other words, buffer 2 retains a combination of transmissions 1 and 2. Again, pursuant to this example, decoding of the contents of buffer 2 (i.e., transmissions 1 and 2 in combination) is unsuccessful. Transmission 3 is received and stored in buffer 1 in combination with the contents retained previously by buffer 2. Accordingly, buffer 1 retains transmissions 1 through 3. Transmissions 1 through 3 provide sufficient redundancy to enable successful decoding at which point an acknowledgment message is sent that signals the data packet has been received and decoded.

Due to many factors and constraints on data transmission, and in particular on wireless data transmission, the acknowledgment is not always detected. Proper detection of the acknowledgment signal ensures that a transmitter of the data can proceed to the next successive data packet of a data stream. However, when the acknowledgment signal is not successfully delivered, the transmitter and receiver fall out of synchronicity. For example, the transmitter, failing to detect the acknowledgment, re-transmits the packet while the receiver anticipates the next successive packet. By re-decoding a next transmission, a receiver can validate whether the acknowledgment has been detected or has not been detected.

Pursuant to the illustrated scheme in FIG. 6, the buffer states prior to successful decoding are preserved. For example, transmissions 1 and 2 are retained but not transmission 3. Transmission 4 is received and combined in a buffer 1 with the buffer state immediately prior to successful decoding. In other words, buffer 1 retains the combination of transmissions 1, 2 and 4. The combination of transmissions 1, 2 and 4 is re-decoded to validate acknowledgment detection. A successful re-decode indicates that transmission 4 is a re-transmission of a data packet and not a subsequent packet in a sequence as expected following an acknowledgment signal. Accordingly, an inference can be made that the acknowledgment has not been detected by the transmitter. Upon a successful re-decode, another acknowledgment signal can be sent and transmission 4 is retained by the buffer. It is to be appreciated that a normal decode can occur in parallel to the re-decode process. Pursuant to an illustration, transmission 4 (e.g., the first transmission following a successful decode) can be retained by buffer 2 as if being the first transmission of a data packet. A subsequent transmission, for example transmission 5, can be received. Transmission 5 is combined with the contents of buffer 1 and stored in buffer 2. A re-decode is performed on the combination of transmission 1, 2, 4 and 5 to validate detection of the acknowledgment message. A successful re-decode provides an indication that the acknowledgment has not been detected. An unsuccessful re-decode provides an indication that the acknowledgment has been detected and that the latest transmission is part of a successive data packet in the data stream. In addition, transmission 5 can be combined only with transmission 4 and decoded normally as if transmission 4 and 5 are the first and second transmissions of a subsequent data packet.

Figure 7:
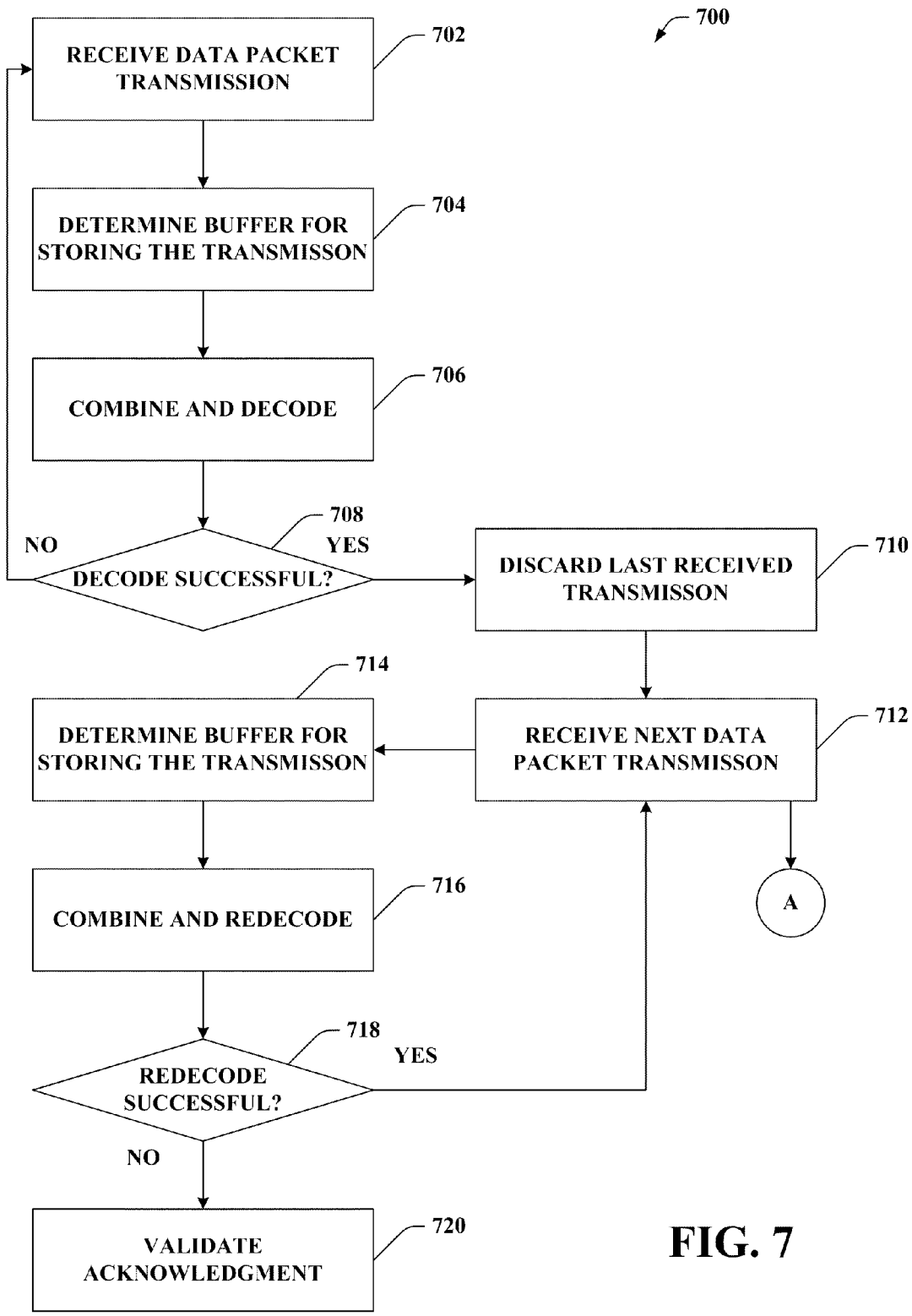
FIG. 7 is an illustration of an example validation scheme according to an aspect of the subject disclosure.

FIG. 7 illustrates a methodology 700 that facilitates reliably receiving a data transmission. Method 700 can be employed by a receiver, among other things, to validate that an acknowledgment message has been detected by a transmitter. In an embodiment, method 700 can be implemented on a mobile device and/or a base station in a wireless communications system. At reference numeral 702, a data packet transmission is received. The data packet can be at least one packet from a plurality of data packets in a series that comprises a data stream. In addition, the data packet can be a retransmission of a previously sent packet. At 704, a determination is made as to which buffer should retain the received data packet. For example, the receiver can include one or more buffers that retain received transmissions prior to decoding. In an embodiment, two buffers can be included and the receiver alternates between the two buffers for each received transmission. At reference numeral 706, the obtained data packet is combined with previously received packets. As it can require several transmissions to provide sufficient redundancy for a successful decode, one or more copies of the data packet can persist. At 708, a decode is attempted on the combination. If the decode is unsuccessful, the method 700 proceeds to reference numeral 702 where another data packet transmissions is received. According to an aspect, the packet transmission is a re-transmission of the previously received data packet.

If the decode is successful, the method 700 proceeds to reference numeral 710 where the last received transmission is discarded. In other words, the transmission that leads to the successful decode is discarded and the buffers return to a state before successful decoding occurred. At 712, a next data packet is received. This packet is the transmission received subsequent to successful decoding. At reference numeral 714, a determination is made again as to which buffer should retain the received data packet. At 716, the newly obtained data packet is combined with previously received packets. At reference numeral 718, a re-decode is attempted. If the re-decode is successful, the last received data packet is a re-transmission of previously received packets. Accordingly, a successful re-decode provides an indication that the acknowledgment has not been detected. If the re-decode is determined successful at reference numeral 718, the method proceeds to 712 and a next data packet transmission is received to be combined and re-decoded. If, at reference numeral 718, the re-decode is unsuccessful, the method 700 proceeds to reference numeral 720. At 720, validation that the acknowledgment signal has been detected occurs. Thus, an unsuccessful re-decode of combined data packets provides an indication that the acknowledgment signal has been detected. It is to be appreciated that a normal decode process such as the method 500 described with reference to FIG. 5 can concurrently take place to the re-decode process. For example, the data transmission received at reference numeral 712 can be forwarded to method 500 for normal decoding.

Figure 8:
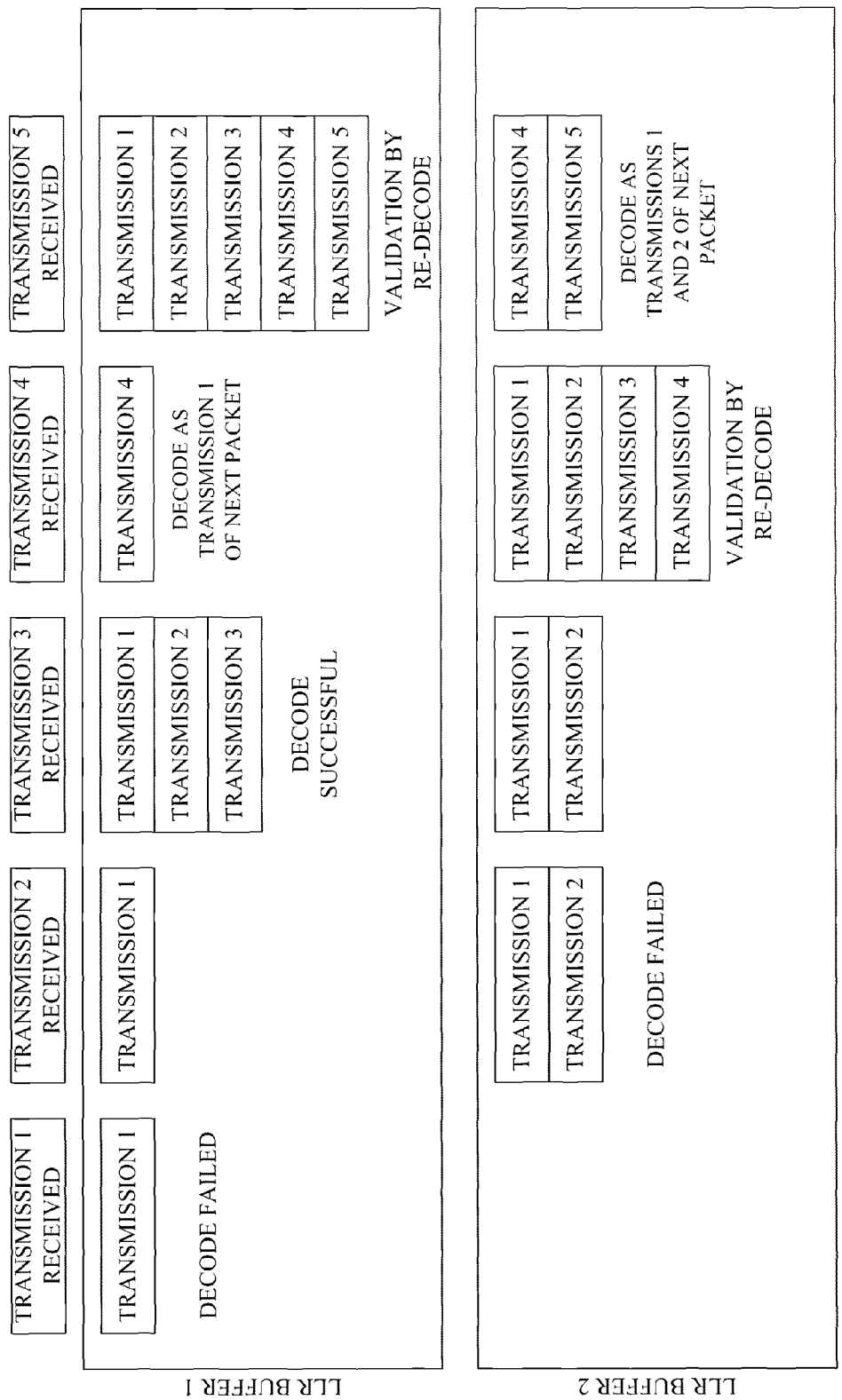
FIG. 8 is an illustration of an example methodology that facilitates validation by re-decoding in accordance with an aspect of the subject disclosure.

Referring to FIG. 8, illustrated is an example implementation of a validation by re-decoding scheme according to an aspect of the subject disclosure. A data packet is received as a plurality of transmissions. While transmissions 1 through 5 are depicted in FIG. 8, it is to be appreciated that a data packet can be received in any number of transmissions. For example, a single transmission of a data packet can be sufficient to enable successful decoding. In addition, two or more transmissions can be necessary to collect a sufficient level of redundancy to overcome errors in individual transmissions of a data packet. Upon successful decoding, re-decoding can occur on subsequent transmissions to validate acknowledgment detection by a transmitter.

Pursuant to the illustration in FIG. 8, transmission 1 is received. This transmission can be retained by buffer 1. In this example, decoding of transmission 1 is unsuccessful. Subsequently, transmission 2 is received and retained in buffer 2 along with the contents previously retained in buffer 1. In other words, buffer 2 retains a combination of transmissions 1 and 2. Again, pursuant to this example, decoding of the contents of buffer 2 (i.e., transmission 1 and 2 in combination) is unsuccessful. Transmission 3 is received and stored in buffer 1 in combination with the contents retained previously by buffer 2. Accordingly, buffer 1 retains transmissions 1 through 3. Transmissions 1 through 3 provide sufficient redundancy to enable successful decoding at which point an acknowledgment message is sent that signals the data packet has been received and decoded.

Pursuant to the illustrated scheme in FIG. 8, the buffers are preserved following decode. For example, transmissions 1, 2 and 3 are retained. Transmission 4 is received and combined in a buffer 2 with the contents of buffer 1. In other words, buffer 2 now retains the combination of transmissions 1, 2, 3 and 4. The combination of transmissions 1, 2, 3 and 4 is re-decoded. A successful re-decode indicates that transmission 4 is a retransmission of a data packet and not a subsequent packet in a sequence as expected following an acknowledgment signal. Accordingly, an inference can be made that the acknowledgment has not been detected by the transmitter. Upon a successful re-decode, another acknowledgment signal can be sent and transmission 4 is retained by the buffer in combination. It is to be appreciated that a normal decode can occur in parallel to the re-decode process. Pursuant to an illustration, transmission 4 (e.g., the first transmission following a successful decode) can be retained by buffer 1 as if being the first transmission of a data packet. A subsequent transmission, for example transmission 5, can be received. Transmission 5 is combined with the contents of buffer 2 and stored in buffer 1. A re-decode is performed on the combination of transmissions 1, 2, 3, 4 and 5 to validate detection of the acknowledgment message. A successful re-decode provides an indication that the acknowledgment has not been detected. An unsuccessful re-decode provides an indication that the acknowledgment has been detected and that the latest transmission is part of a successive data packet in the data stream. In addition, transmission 5 can be combined only with transmission 4 in buffer 2 and decoded normally as if transmission 4 and 5 are the first and second transmissions of a subsequent data packet.

Figure 9:
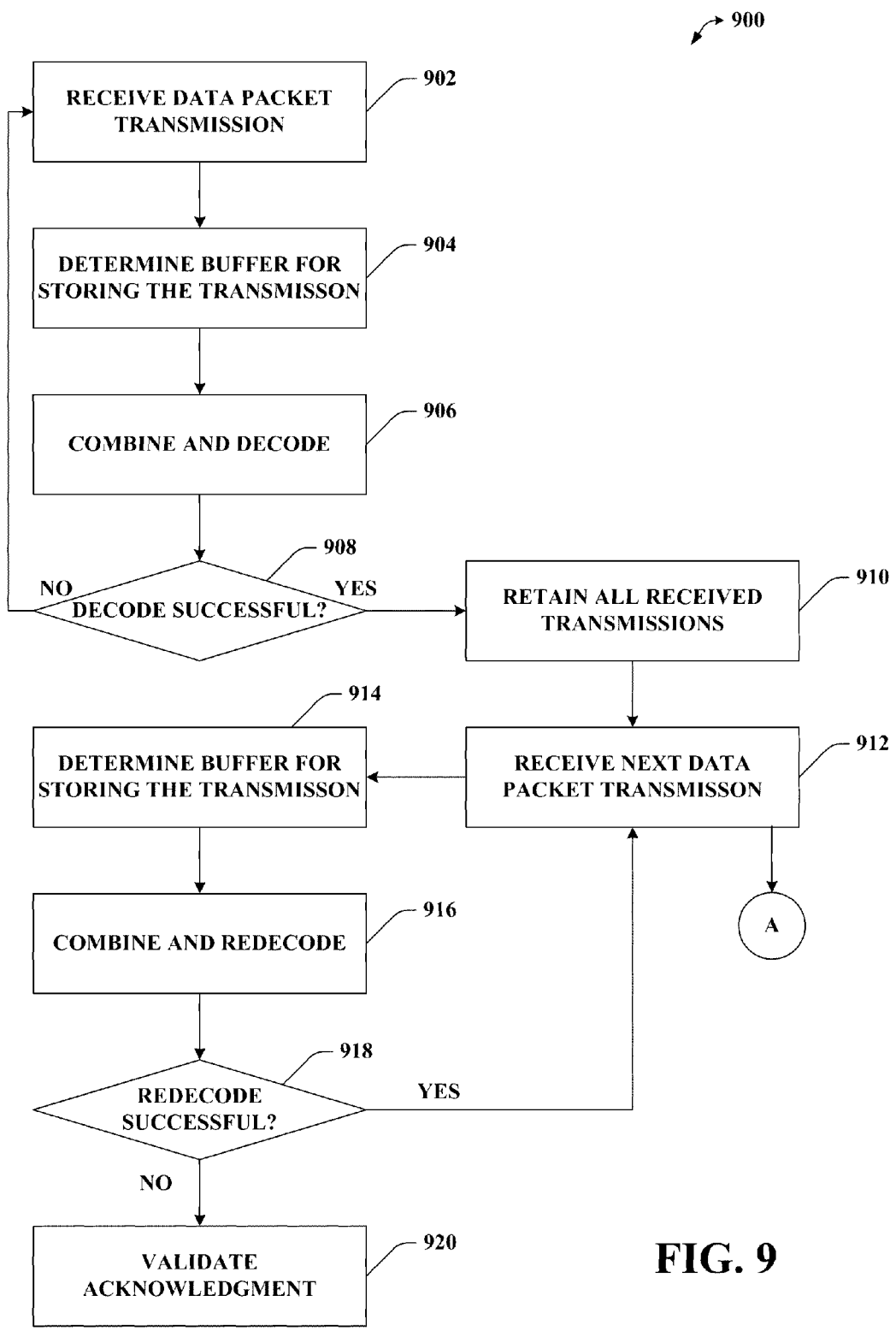
FIG. 9 is an illustration of an example mobile device that facilitates validating acknowledgment detection by re-decoding.

FIG. 9 illustrates a methodology 900 that facilitates reliably receiving a data transmission. Method 900 can be employed by a receiver, among other things, to validate that an acknowledgment message has been detected by a transmitter. In an embodiment, method 900 can be implemented on a mobile device and/or a base station in a wireless communications system. At reference numeral 902, a data packet transmission is received. The data packet can be at least one packet from a plurality of data packets in a series that comprises a data stream. In addition, the data packet can be a retransmission of a previously sent packet. At 904, a determination is made as to which buffer should retain the received data packet. At reference numeral 906, the obtained data packet is combined with previously received packets. As it can require several transmissions to provide sufficient redundancy for a successful decode, one or more copies of the data packet can persist. The one or more copies can be combined with the first data packet to facilitate validation of acknowledgment detection. At 908, a decode is attempted on the combination. If the decode is unsuccessful, the method 900 proceeds to reference numeral 902 where another data packet transmission is received. In one aspect, the packet transmission is a re-transmission of the previously received data packet.

If the decode is successful, the method 900 proceeds to reference numeral 910 where all transmissions received until the successful decode are retained for code combining with later received transmissions. At 912, a next data packet is received. This packet is the first transmission received subsequent to successful decoding. At reference numeral 914, a determination is made as to which buffer should retain the received data packet. At 916, the newly obtained data packet is combined with previously received packets. At reference numeral 918, a re-decode is attempted. If the re-decode is successful, the last received data packet is a re-transmission of previously received packets. If the re-decode is determined successful at reference numeral 918, the method proceeds to 912 and a next data packet transmission is received to be combined and re-decoded. If, at reference numeral 918, the re-decode is unsuccessful, the method 900 proceeds to reference numeral 920. At 920, t validation that the acknowledgment signal has been detected occurs. It is to be appreciated that a normal decode process such as the method 500 described with reference to FIG. 5 can concurrently take place to the re-decode process. For example, the data transmission received at reference numeral 912 can be forwarded to method 500 for normal decoding.

It will be appreciated that, in accordance with one or more aspects described herein, inferences can be made regarding whether an acknowledgment signal has been detected by a transmitter, a packet transmission should be disregarded, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to validating detection of an acknowledgment signal. By way of further illustration, an inference may be made related to determining whether a re-decode indicates the acknowledgment has been detected, code combining packet retransmissions to provide redundancy, selecting buffers for retaining received packets, etc. It will be appreciated that the foregoing examples are illustrative in nature and are not intended to limit the number of inferences that can be made or the manner in which such inferences are made in conjunction with the various embodiments and/or methods described herein.

Figure 10:
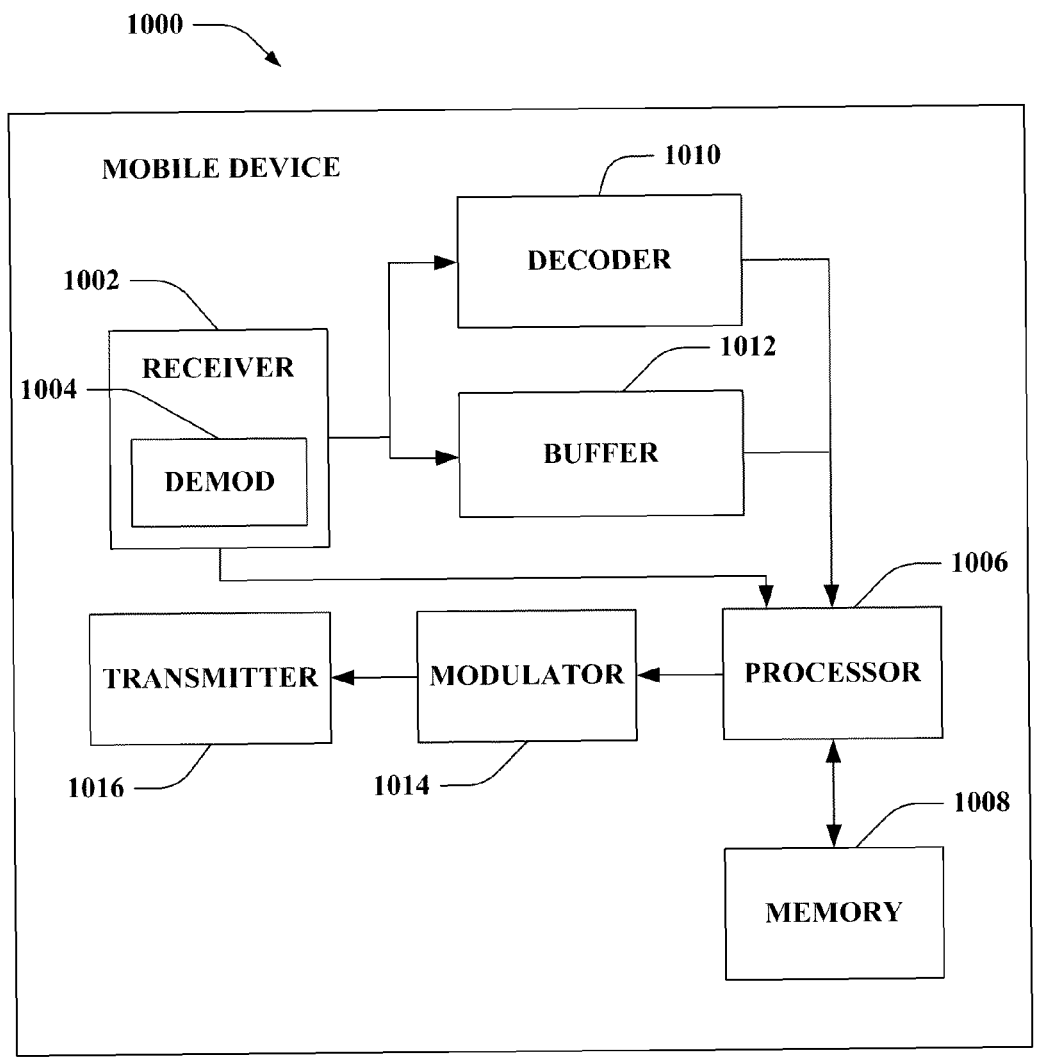
FIG. 10 is an illustration of an example system that facilitates validation by re-decoding.

FIG. 10 is an illustration of a mobile device 1000 that facilitates employing acknowledgment detection validation by re-decoding. Mobile device 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation and the like. Processor 1006 can be a processor dedicated to analyzing information received by receiver 1002 and/or generating information for transmission by a transmitter 1016, a processor that controls one or more components of mobile device 1000, and/or a processor that both analyzes information received by receiver 1002, generates information for transmission by transmitter 1016, and controls one or more components of mobile device 1000.

Mobile device 1000 can additionally comprise memory 1008 that is operatively coupled to processor 1006 and that may store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1002 is further operatively coupled to a decoder 1010 that attempts to decode data transmissions and/or data packets obtained by receiver 1002 to recover traffic data of a data stream from the coded, modulated and/or interleaved symbols of the transmission. Several retransmissions of a particular data packet can be required before a successful decode can occur. For example, errors can be introduced in a transmission due to channel conditions, power constraints, interference levels, or the like such that the packet cannot be decoded. Retransmissions of a particular packet provide decoder 1010 with sufficient information or redundancies to successfully recover the traffic data associated with the data packet. Processor 1006 is further coupled to a buffer 1012 that facilitates retaining previous transmissions for combination with newly obtained packets. Upon a successful decode, mobile device 1000 can send an acknowledgment. The buffer 1012 retains the previous data packet transmissions to validate acknowledgment detection. The decoder 1010 can re-decode the newly obtained data packet in combination with the previously received packets. Mobile device 1000 still further comprises a modulator 1014 and a transmitter 1016 that transmits a signal (e.g., acknowledgment message) to, for instance, a base station, another mobile device, etc. Although depicted as being separate from the processor 1006, it is to be appreciated that decoder 1010, buffer 1012, and/or modulator 1014 may be part of processor 1006 or a number of processors (not shown).

Figure 11:
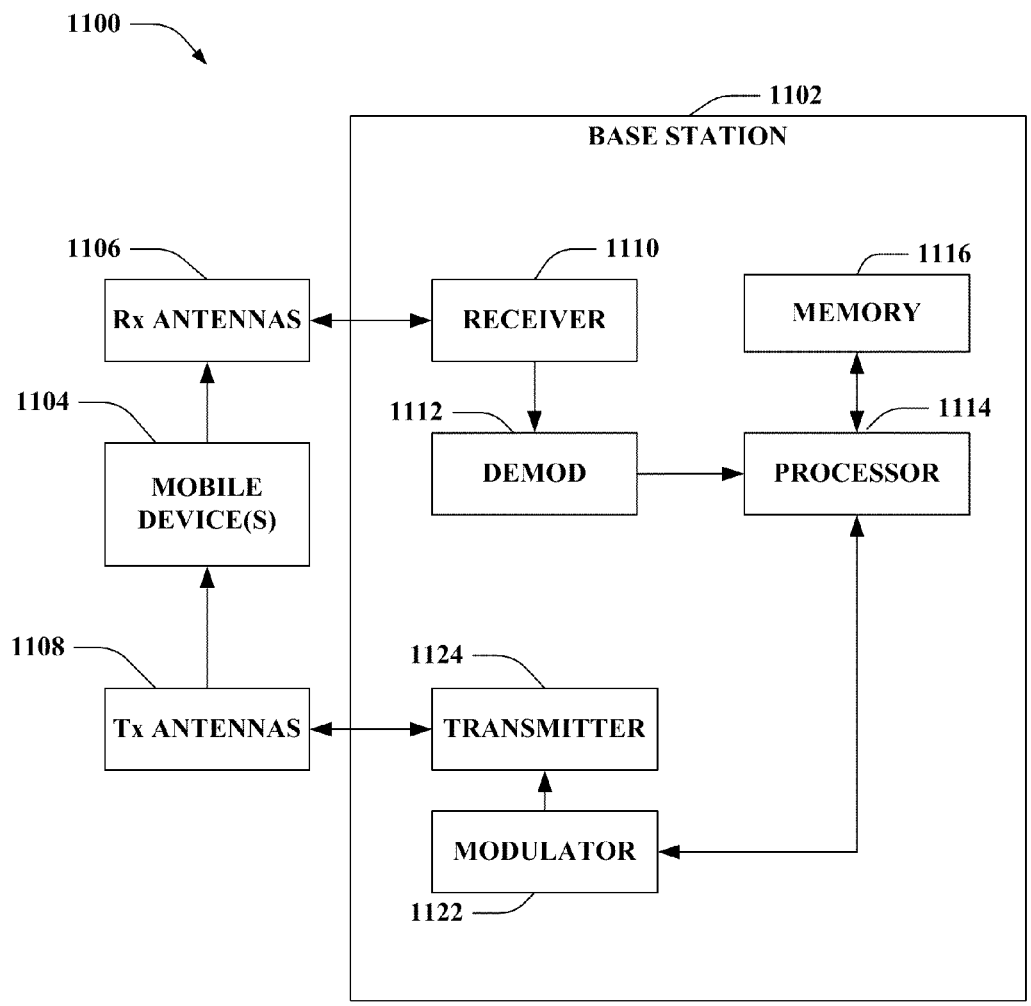
FIG. 11 is an illustration of an example wireless network environment that can be employed in conjunction with the various systems and methods described herein.

FIG. 11 is an illustration of a system 1100 that facilitates employing acknowledgment validation by re-decoding. System 1100 comprises a base station 1102 (e.g., access point, . . . ) with a receiver 1110 that receives signal(s) from one or more mobile devices 1104 through a plurality of receive antennas 1106, and a transmitter 1122 that transmits to the one or more mobile devices 1104 through a plurality of transmit antennas 1108. In an aspect, transmitter 1122 can transmit a data stream to the one or more mobile devices 1104 as a sequence of data packets such that each packet is transmitted in turn until acknowledged. Receiver 1110 can receive information from receive antennas 1106 and is operatively associated with a demodulator 1112 that demodulates received information. Demodulated symbols are analyzed by a processor 1114 that can be similar to the processor described above with regard to FIG. 10, and which is coupled to a memory 1116 that stores information related to estimating a signal (e.g., pilot) strength and/or interference strength, data to be transmitted to or received from mobile device(s) 1104 (or a disparate base station (not shown)), and/or any other suitable information related to performing the various actions and functions set forth herein. For example, receiver 1110 can receive an acknowledgment signal from the mobile devices 1104 related to a last data packet sent by transmitter 1124. Information to be transmitted may be provided to a modulator 1122. Modulator 1122 can multiplex the information for transmission by a transmitter 1126 through antenna 1108 to mobile device(s) 1104. Although depicted as being separate from the processor 1114, it is to be appreciated that demodulator 1112 and/or modulator 1122 may be part of processor 1114 or a number of processors (not shown).

Figure 12:
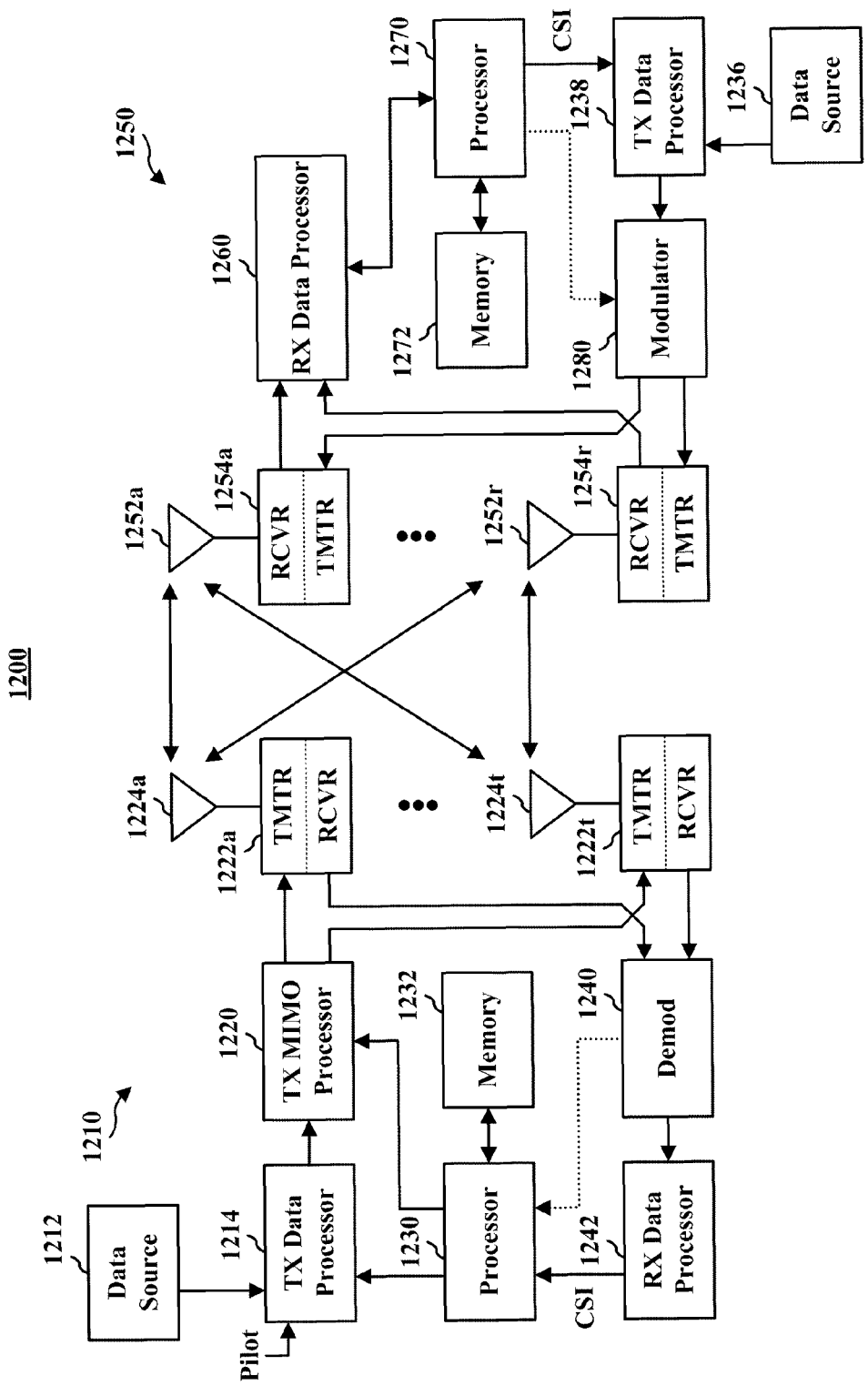
FIG. 12 is an illustration of an example system that facilitates validating acknowledgment detection by re-decoding.

FIG. 12 shows an example wireless communication system 1200. The wireless communication system 1200 depicts one base station 1210 and one mobile device 1250 for sake of brevity. However, it is to be appreciated that system 1200 may include more than one base station and/or more than one mobile device, wherein additional base stations and/or mobile devices may be substantially similar or different from example base station 1210 and mobile device 1250 described below. In addition, it is to be appreciated that base station 1210 and/or mobile device 1250 may employ the systems (FIGS. 1-3 and 10-11) and/or methods (FIGS. 4, 5, 7 and 9) described herein to facilitate wireless communication there between.

At base station 1210, traffic data for a number of data streams is provided from a data source 1212 to a transmit (TX) data processor 1214. According to an example, each data stream may be transmitted over a respective antenna. TX data processor 1214 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 1250 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 1230.

The modulation symbols for the data streams may be provided to a TX MIMO processor 1220, which may further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and down-converts) a respective signal, digitizes the conditioned signal to provide samples, and further processes the samples to provide a corresponding "received" symbol stream.

An RX data processor 1260 may receive and process the $N_R$ received symbol streams from $N_R$ receivers 1254 based on a particular receiver processing technique to provide $N_T$ "detected" symbol streams. RX data processor 1260 may demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 may periodically determine which precoding matrix to utilize as discussed above. Further, processor 1270 may formulate a reverse link message comprising a matrix index portion and a rank value portion.

The reverse link message may comprise various types of information regarding the communication link and/or the received data stream. The reverse link message may be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 may process the extracted message to determine which precoding matrix to use for determining the beamforming weights.

Processors 1230 and 1270 may direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 13:
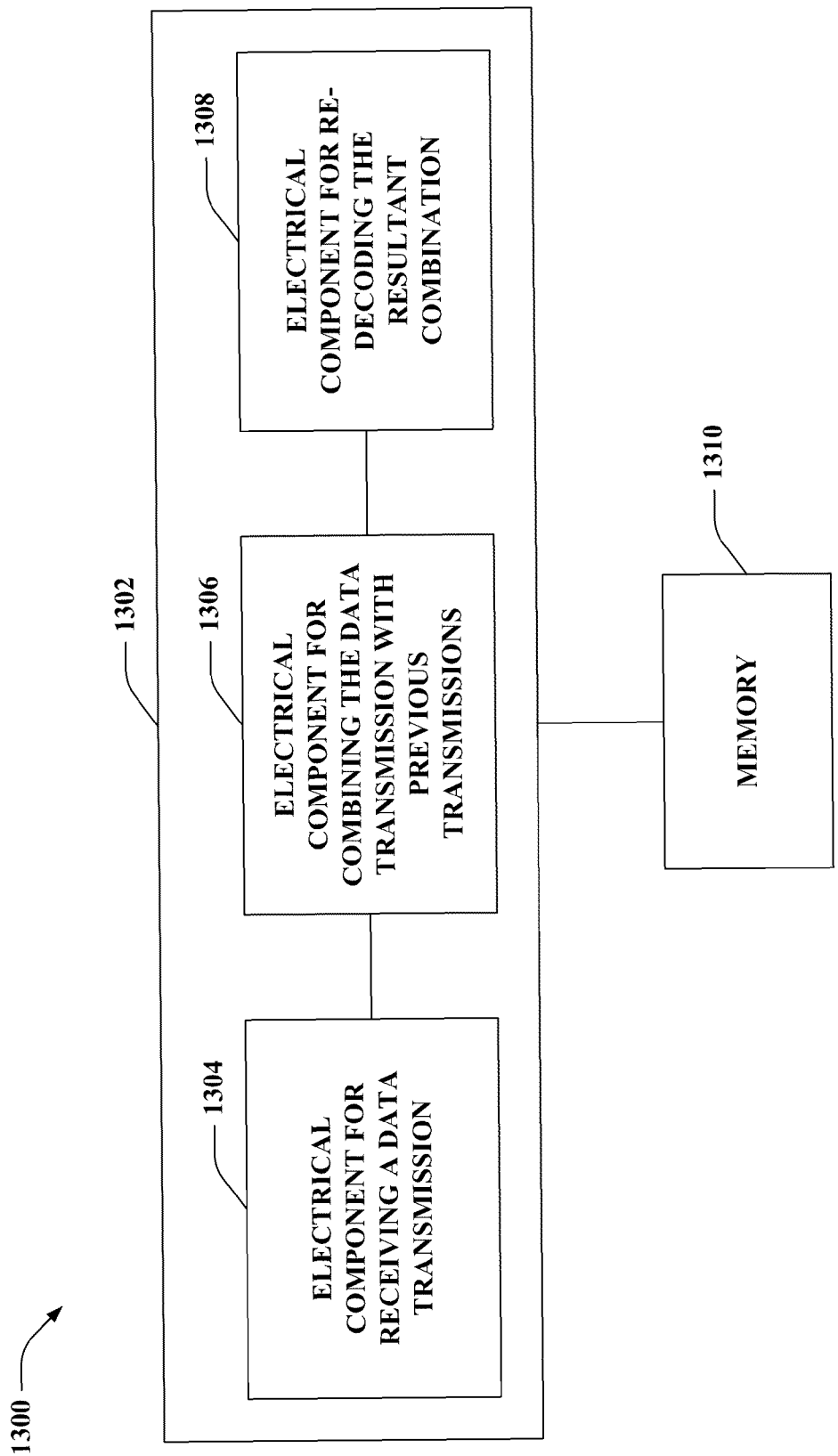
FIG. 13 is an illustration of an example system configured to provide reliable receipt of data packets.

With reference to FIG. 13, illustrated is a system 1300 that effectuates reliable receipt of data packets through enhancement of hybrid automatic repeat requests by validating acknowledgment detection via re-decoding. For example, system 1300 may reside at least partially within a mobile device and/or base station. It is to be appreciated that system 1300 is represented as including functional blocks, which may be functional blocks that represent functions implemented by a processor, software, or combination thereof (e.g., firmware). System 1300 includes a logical grouping 1302 of electrical components that can act in conjunction. For instance, logical grouping 1302 may include an electrical component for receiving a data transmission. The data transmission can correspond to a particular data packet among a sequence of data packets. Further, logical grouping 1302 may comprise an electrical component for combining the data transmission with previously received transmissions 1306. For example, one or more buffers can be employed to retain previously retained transmissions. Moreover, logical grouping 1302 can include an electrical component for decoding and re-decoding a resultant combination 1308. For instance, the new data transmission can be stored in the buffer in addition to the previously received data transmissions and the complete contents of the buffer can be provided to a decoder for re-decoding. Additionally, system 1300 may include a memory 1310 that retains instructions for executing functions associated with electrical components 1304, 1306 and 1308. While shown as being external to memory 1308, it is to be understood that one or more of electrical components 1304, 1306 and 1308 may exist within memory 1310.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus adapted for communications, comprising:
a memory that retains instructions related to:
receiving a data transmission corresponding to a data packet from a sequence of data packets;
if the data transmission is successfully decoded, sending an acknowledgment message to a transmitter;
receiving a next data transmission corresponding to a data packet from the sequence of data packets;
combining the next data transmission with one or more previously received data transmissions;
re-decoding the resultant combination to determine whether the next data transmission corresponds to a last decoded data packet;
if the resultant combination is successfully re-decoded, sending a repeat acknowledgment message to the transmitter; and if the resultant combination is not successfully re-decoded, assigning the next data transmission to a subsequent data packet from the sequence of data packets; and a processor coupled to the memory, configured to execute the instructions retained in the memory.

2. The apparatus of claim 1, wherein the memory further retains instructions related to:

code-combining the one or more previously received data transmissions;

decoding the code-combined one or more previously received data transmissions; and sending an acknowledgment message to the transmitter of the one or more previously received data transmissions.

3. The apparatus of claim 2, wherein the memory further retains instructions related to:

discarding a last successive data transmission from the one or more previously received data transmissions.

4. The apparatus of claim 2, wherein the memory further retains instructions related to:

retaining the one or more previously received data transmissions.

5. The apparatus of claim 1, wherein the instructions related to receiving a data transmission comprises storing the data transmission in at least one buffer.

6. The apparatus of claim 5, wherein the memory further retains instructions related to:

storing successive data transmissions in alternate parallel buffers.

7. The apparatus of claim 6, wherein the memory further retains instructions related to:

storing data transmissions in a primary buffer in combination with contents of a secondary buffer.

8. The apparatus of claim 1, wherein the memory further retains instructions related to:

decoding concurrently the data transmission.

9. A method for communications, comprising:

receiving a data transmission corresponding to a data packet from a sequence of data packets;

if the data transmission is successfully decoded, sending an acknowledgment message to a transmitter;

receiving a next data transmission corresponding to a data packet from the sequence of data packets;

combining the next data transmission with one or more previously received data transmissions;

re-decoding the resultant combination to determine whether the next data transmission corresponds to a last decoded data packet;

if the resultant combination is successfully re-decoded, sending a repeat acknowledgment message to the transmitter; and if the resultant combination is not successfully re-decoded, assigning the next data transmission to a subsequent data packet from the sequence of data packets.

10. The method of claim 9, further comprising:

code-combining the one or more previously received data transmissions;

decoding the code-combined one or more previously received data transmissions; and sending an acknowledgment message to the transmitter of the one or more previously received data transmissions.

11. The method of claim 10, further comprising:

discarding a last successive data transmission from the one or more previously received data transmissions.

12. The method of claim 10, further comprising:

retaining the one or more previously received data transmissions.

13. The method of claim 9, wherein the receiving a data transmission comprises storing the data transmission in at least one buffer.

14. The method of claim 13, further comprising:

storing successive data transmissions in alternate parallel buffers.

15. The method of claim 14, further comprising:

storing data transmissions in a primary buffer in combination with contents of a secondary buffer.

16. The method of claim 9, further comprising:

decoding concurrently the data transmission.

17. A non-transitory machine-readable medium having stored thereon machine-executable instructions for:

receiving a data transmission corresponding to a data packet from a sequence of data packets;

if the data transmission is successfully decoded, sending an acknowledgment message to a transmitter;

receiving a next data transmission corresponding to a data packet from the sequence of data packets;

combining the next data transmission with one or more previously received data transmissions;

re-decoding the resultant combination to determine whether the next data transmission corresponds to a last decoded data packet;

if the resultant combination is successfully re-decoded, sending a repeat acknowledgment message to the transmitter;

and if the resultant combination is not successfully re-decoded, assigning the next data transmission to a subsequent data packet from the sequence of data packets.

18. The non-transitory machine-readable medium of claim 17, further comprising instructions for:

code-combining the one or more previously received data transmissions;

decoding the code-combined one or more previously received data transmissions; and sending an acknowledgment message to the transmitter of the one or more previously received data transmissions.

19. The non-transitory machine-readable medium of claim 18, further comprising instructions for:

discarding a last successive data transmission from the one or more previously received data transmissions.

20. The non-transitory machine-readable medium of claim 18, further comprising instructions for:

retaining the one or more previously received data transmissions.

21. The non-transitory machine-readable medium of claim 17, wherein the machine-executable instructions for receiving a data transmission comprises storing the data transmission in at least one buffer.

22. An apparatus adapted for communications, comprising:

means for receiving a data transmission corresponding to a data packet from a sequence of data packets;

means for sending an acknowledgment message to a transmitter if the data transmission is successfully decoded;

means for receiving a next data transmission corresponding to a data packet from the sequence of data packets;

means for combining the next data transmission with one or more previously received data transmissions;

means for re-decoding the resultant combination to determine whether the next data transmission corresponds to a last decoded data packet;

means for sending a repeat acknowledgment message to the transmitter if the resultant combination is successfully re-decoded;

and means for assigning the next data transmission to a subsequent data packet from the sequence of data packets if the resultant combination is not successfully re-decoded.

23. The apparatus of claim 22, further comprising:

means for code-combining the one or more previously received data transmissions;

means for decoding the code-combined one or more previously received data transmissions; and means for sending an acknowledgment message to the transmitter of the one or more previously received data transmissions.

24. The apparatus of claim 23, further comprising:

means for discarding a last successive data transmission from the one or more previously received data transmissions.

25. The apparatus of claim 23, further comprising:

means for retaining the one or more previously received data transmissions.

26. The apparatus of claim 22, wherein the means for receiving a data transmission comprises means for storing the data transmission in at least one buffer.

27. An apparatus adapted for communications, comprising:

an integrated circuit configured to:

receive a data transmission corresponding to a data packet from a sequence of data packets;

if the data transmission is successfully decoded, send an acknowledgment message to a transmitter;

receive a next data transmission corresponding to a data packet from the sequence of data packets;

combine the next data transmission with one or more previously received data transmissions;

re-decode the resultant combination to determine whether the next data transmission corresponds to a last decoded data packet;

if the resultant combination is successfully re-decoded, send a repeat acknowledgment message to the transmitter;

and if the resultant combination is not successfully re-decoded, assign the next data transmission to a subsequent data packet from the sequence of data packets.

28. The apparatus of claim 27, wherein the integrated circuit is further configured to:

code-combine the one or more previously received data transmissions;

decode the code-combined one or more previously received data transmissions; and send an acknowledgment message to the transmitter of the one or more previously received data transmissions.

29. The apparatus of claim 28, wherein the integrated circuit is further configured to:

discard a last successive data transmission from the one or more previously received data transmissions.

30. The apparatus of claim 28, wherein the integrated circuit is further configured to:

retain the one or more previously received data transmissions.

31. The apparatus of claim 27, wherein receiving a data transmission comprises storing the data transmission in at least one buffer.

* * * * *